(12) United States Patent
Boland

(10) Patent No.: US 8,719,995 B2
(45) Date of Patent: May 13, 2014

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1167 days.

(21) Appl. No.: 12/565,991

(22) Filed: Sep. 24, 2009

(65) Prior Publication Data

US 2010/0107353 A1 May 6, 2010

(30) Foreign Application Priority Data

Sep. 25, 2008 (EP) ..................................... 08165114

(51) Int. Cl.
*B60S 1/40* (2006.01)
(52) U.S. Cl.
USPC ..................................... 15/250.43; 15/250.32
(58) Field of Classification Search
USPC ....................................................... 15/250.32
IPC .......................................................... B60S 1/32
See application file for complete search history.

(56) References Cited

U.S. PATENT DOCUMENTS

| 2,782,447 A * | 2/1957 | Anderson | 15/250.453 |
| 2009/0165236 A1* | 7/2009 | Lee et al. | 15/250.32 |
| 2011/0047741 A1* | 3/2011 | Avsar | 15/250.32 |

FOREIGN PATENT DOCUMENTS

| DE | 102005052258 | * | 5/2007 | ............... | B60S 1/32 |
| DE | 102005052258 A1 | | 5/2007 | | |
| EP | 0714820 A1 | | 6/1996 | | |
| EP | 1491416 A1 | * | 12/2004 | ............... | B60S 1/38 |
| FR | 9614262 | * | 11/1996 | ............... | B60S 1/32 |
| FR | 2 755926 | | 5/1998 | | |

* cited by examiner

*Primary Examiner* — Monica Carter
*Assistant Examiner* — Stephanie Berry
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, which windscreen wiper device comprises a connecting device for an oscillating wiper arm, with the special feature that an end wall of at least one connecting piece comprises an opening, wherein a part of the wiper blade permanently extends through the opening and beyond the connecting piece, and wherein the part of the wiper blade is reinforced.

5 Claims, 3 Drawing Sheets

WINDSCREEN WIPER DEVICE

This application claims priority to European Patent Application No. 08165114.3, filed Sep. 25, 2008, and is incorporated herein by reference.

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, which windscreen wiper device comprises a connecting device for an oscillating wiper arm.

2. Related Art

Such a windscreen wiper device is known from European patent publication no. 1 491 416 of the same Applicant. The prior art windscreen wiper device is in particular designed as a "yokeless" wiper device or "flat blade", wherein use is no longer made of several yokes pivotally connected to each other, but wherein the wiper blade is biassed by the carrier element, as a result of which it exhibits a specific curvature. According to the prior art the connecting piece is slided over the neighboring ends of the strips—or vice versa, that is the neighboring ends of the strips are slided into the connecting piece—so that a reliable snap connection between these parts is realized. In the prior art the connecting piece is provided with an opening at its free end so that the wiper blade can freely slide through the connecting piece. In other words, the connecting pieces do not retain the wiper blade, so that the connecting pieces allow a relative movement of the wiper blade along the longitudinal strips in the connecting pieces.

One drawback of the prior art windscreen wiper device is the fact that the connecting pieces (in practice also called "end caps") and the wiper blade are not connected in a durable, solid manner. Particularly, when a rubber wiping element is only retained onto the strips (and not onto an upper part of the wiper blade facing away from the windscreen to be wiped), the wiping area can seriously decrease in case the wiping element is moving towards the blade bottom.

SUMMARY OF THE INVENTION

The object of the invention is to improve the prior art as indicated above, in particular to provide a windscreen wiper device, wherein the longitudinal strips and the connecting pieces ("end caps") are interconnected in a durable, solid manner, and wherein the wiping properties are improved.

In order to accomplish that objective, a windscreen wiper device of the kind referred to in the introduction according to the invention is characterized in that an end wall of at least one connecting piece comprises an opening, wherein a part of the wiper blade permanently extends through the opening and beyond the connecting piece, and wherein the windscreen wiper device comprises reinforcement means for reinforcing the part of the wiper blade. As the wiper blade over the part of its length permanently sticks out with respect to the connecting piece, a larger wiping area compared to that of the prior art is obtained, thus improving the wiping properties. However, in order to further improve the wiping properties, the part of the wiper blade permanently extending through the opening and beyond the connecting piece is reinforced, that is stiffened by the reinforcement means. Hence, the part is less "bendable", so that the wiping properties of the part are enhanced.

It is noted that the present invention is not restricted to windscreen wiper devices for cars, but that it also relates to windscreen wiper devices for rail coaches and all other (fast) vehicles.

Advantageously, a free sliding movement of the wiper blade is avoided, so that the connection piece can be firmly attached onto the wiper blade. Particularly, the wiper blade and the connecting piece comprise mutually cooperating means to block a longitudinal movement of the wiper blade in outward direction relative to the connecting piece. More in particular, the grooves of the wiper blade each comprise at least one stop for blocking the longitudinal movement of the wiper blade in outward direction relative to the connecting piece. Preferably, the stops comprise a protrusion extending laterally from a longitudinal wall of the wiper blade located between the two opposing grooves. Particularly, the connecting piece comprises at least two protrusions extending laterally inwardly, and wherein each protrusion is adjacent a corresponding stop on the wiper blade for blocking the longitudinal movement of the wiper blade in outward direction relative to the connecting piece. In other words, the protrusions on the connecting piece and the stops on the wiper blade may be spaced apart during normal use of the windscreen wiper device. However, under the influence of any longitudinal outwardly directed force on the wiper blade, the wiper blade is allowed to move in longitudinal outward direction, causing the stops on the wiper blade to correspondingly move towards the protrusions on the connecting piece, until the protrusions on the connecting piece and the stops on the wiper blade are adjacent one another.

In one preferred embodiment of a windscreen wiper device in accordance with the invention the connecting piece comprises the reinforcement means. Particularly, the reinforcement means comprises at least one longitudinal finger extending outwardly relative to the connecting piece, and wherein the finger rests inside one of the longitudinal grooves of the wiper blade. Preferably, the reinforcement means comprises two longitudinal fingers extending outwardly relative to the connecting piece, and wherein each finger rests inside a corresponding longitudinal grooves of the wiper blade. The finger(s) particularly extend(s) through the opening of the connecting piece. In another preferred embodiment, the finger(s) is/are made in one piece with the connecting piece.

In another preferred embodiment of a windscreen wiper device according to the invention, the reinforcement means are formed by a part of at least one longitudinal strip that permanently extends through the opening and beyond the connecting piece. Preferably, the longitudinal strip and the connecting piece comprise mutually cooperating means to block a longitudinal movement of the longitudinal strip in outward direction relative to the connecting piece. In another preferred embodiment, edges of the opening of the connecting pieces are bent inwardly, and wherein the edges rest inside a recess of the longitudinal strip. The recess is particularly formed along the exterior longitudinal side of the longitudinal strip.

Advantageously, the wiper blade and the strips comprise mutually cooperating means to block a longitudinal movement of the wiper blade in outward direction relative to the connecting piece. Particularly, the grooves of the wiper blade each comprise at least one stop for blocking the longitudinal movement of the wiper blade in outward direction relative to the connecting piece. More in particularly, the stops comprise a protrusion extending laterally from a longitudinal wall of the wiper blade located between the two opposing grooves. Each strip is preferably provided on its interior longitudinal edge with a hole within the outer contour thereof, wherein each stop is located within a corresponding hole in the strips. Preferably, the holes have a non-closed circumference.

THE DRAWINGS

The invention will now be explained in more detail with reference to figures illustrated in a drawing, wherein.

DETAILED DESCRIPTION

Figure 1:
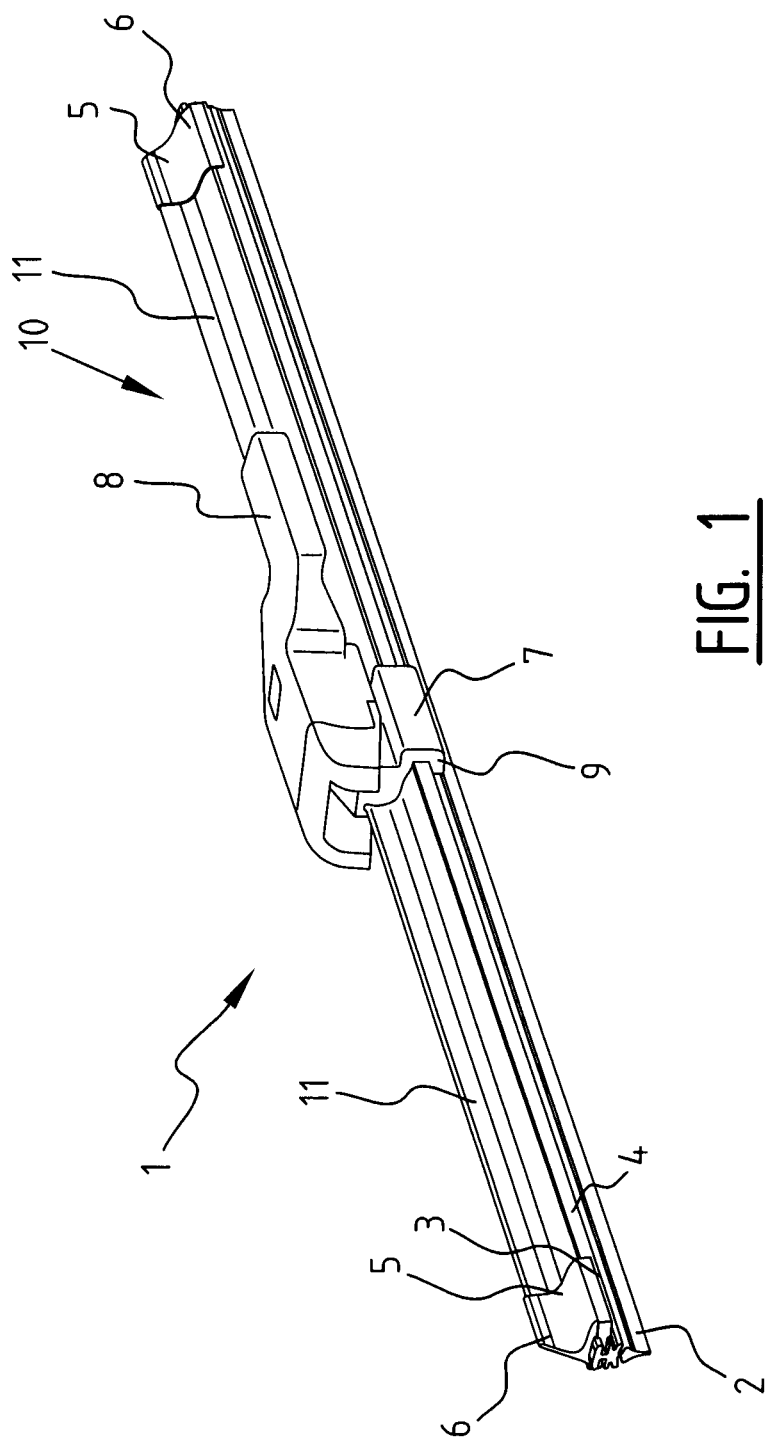
FIG. 1 is a total perspective, schematic view of a windscreen wiper device according to the invention.

FIG. 1 shows a preferred variant of a windscreen wiper device 1 of the "flat blade" type according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biassed in a curved position (the curvature in operative position being that of a windscreen to be wiped). Neighboring ends 5 of strips 4 are interconnected on either side of the windscreen wiper device 1 by means of connecting pieces 6 or "end caps" functioning as clamping members. In this embodiment, the connecting pieces 6 are separate constructional elements, which may be form-locked as well as force-locked to the ends 5 of strips 4. In another preferred variant, the connecting pieces 6 or "end caps" are in one piece with the strips 4 made of spring band steel. In the latter case the connecting pieces form transverse bridges for the strips 4, as it were. The windscreen wiper device 1 is furthermore built up of a connecting device 7 of plastic material for an oscillating wiper arm 8. Connecting device 7 comprises clamping members 9 that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. The preferred embodiment of FIG. 1 according to the invention comprises a spoiler or "air deflector" 10 including two separate sub-spoilers 11. Each sub-spoiler 11 is detachably connected in its entirety to the wiper blade 2 on opposite sides of the connecting device 7.

In FIG. 2a a perspective view of an end of the wiper blade 2 of FIG. 1 is shown, wherein corresponding parts have been designated with the same reference numerals. As can be seen from FIG. 2a, an end wall 12 of the end cap 6 comprises an opening 13, wherein a part 14 of the wiper blade 2 permanently extends through the opening 13 and beyond the end cap 6 (FIGS. 2a through 2c). As the wiper blade 2 over the part 14 of its length permanently sticks out with respect to the end cap 6, a larger wiping area compared to that of the prior art is obtained, thus improving the wiping properties. However, in order to further improve the wiping properties, the part 14 of the wiper blade 2 that permanently extends through the opening 13 and beyond the end cap 6, is reinforced, that is stiffened by two stiffening fingers 15. The fingers 15 are integral with the plastic end cap 6 and extend outwardly in longitudinal direction thereof. As can be seen from FIG. 2a, the stiffening fingers 15 are disposed in the longitudinal grooves 3 of the wiper blade 2 by sliding the end cap 6 onto the wiper blade 2. With reference to FIG. 2c relating to a bottom view of the end cap 6 (while the wiper blade 2 being absent), the strips 4 are each provided with a protrusion extending laterally from a longitudinal exterior edge of the strips. When the end cap 6 is slidably mounted onto the wiper blade 2 and subsequently onto the neighbouring ends 5 of the strips 4, a snap or clicking connection is realized, wherein the protrusions are snapped or clicked between stops 16',16" ("notches 16") inside the end cap 6. Each protrusion rests in a small groove between these opposing stops 16',16". Accordingly, the strips 4 are blocked against any movement in longitudinal direction with respect to the end cap 6. The end cap 6 is also provided with two engaging members 17 made integral therewith, wherein the engaging members 17 engage around the strips 4 so as to form a groove 18 for sliding the strips 4 therein. The engaging members 15 ensure that the strips 4 are blocked against any movement in transversal direction with respect to the end cap 6. The stop 16' facing away from the free end of the end cap 6 is equipped with an inclined upper surface, so that sliding the end cap 6 onto the strips 4 does not take too much force, whereas once the protrusion rests inside the groove dismounting the end cap from the strips 4 cannot take place easily. The stop 16" facing towards the free end of the end cap 6 also ensures that the strips are kept at a mutual constant distance, as the upper end of each strip 4 is located between the stop 16" and a (side) wall of the end cap 6.

Figure 3:
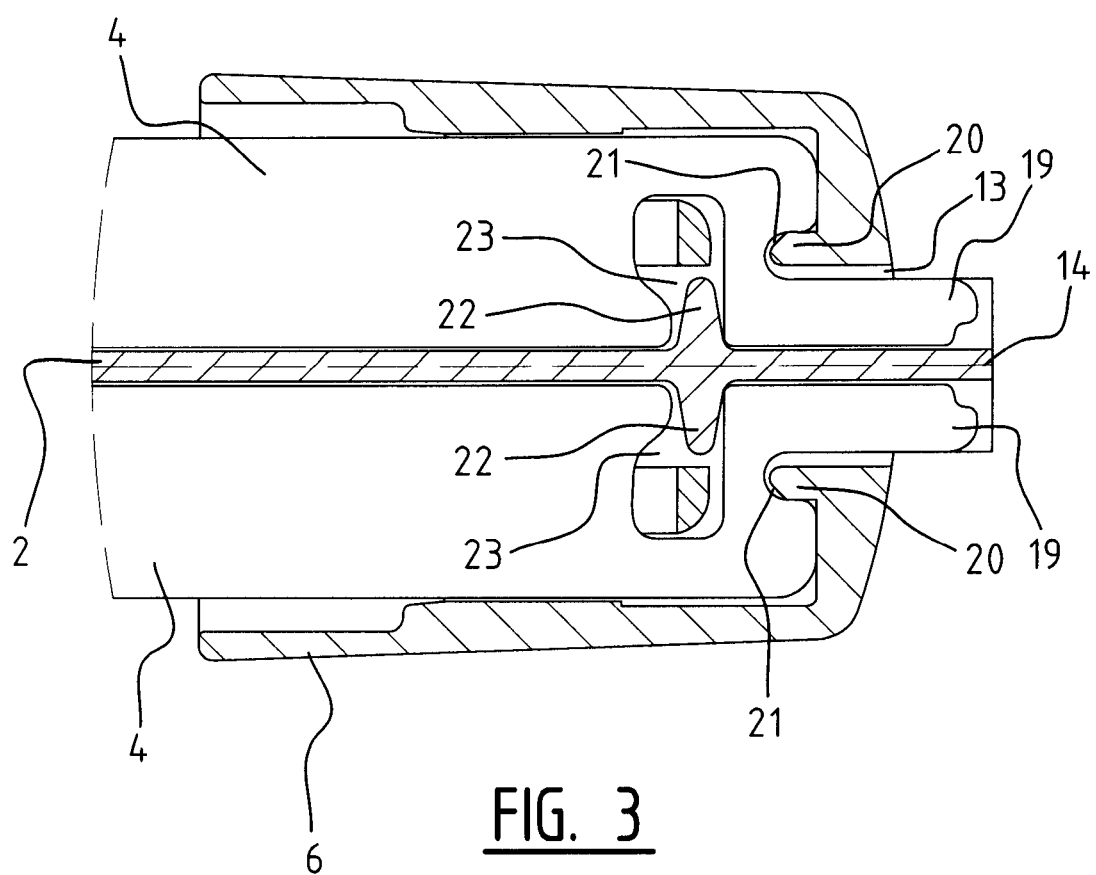
FIG. 3 is a schematic bottom view of an end part of a wiper blade according to a second embodiment, as used in the windscreen wiper device of FIG. 1.

In another preferred embodiment according to FIG. 3, the part 14 of the wiper blade 2 that permanently extends through the opening 13 and beyond the end cap 6, is reinforced, that is stiffened by the two strips 4. In other words, also a part 19 of the strips 14 fitted into the grooves 3 of the wiper blade 2 permanently extends through the opening 13 and beyond the end cap 6. Edges 20 of the opening 13 of the end cap 6 are bent inwardly, whereas the edges 20 rest inside recesses 21 formed along the exterior longitudinal side of the strips 4.

Figure 2:
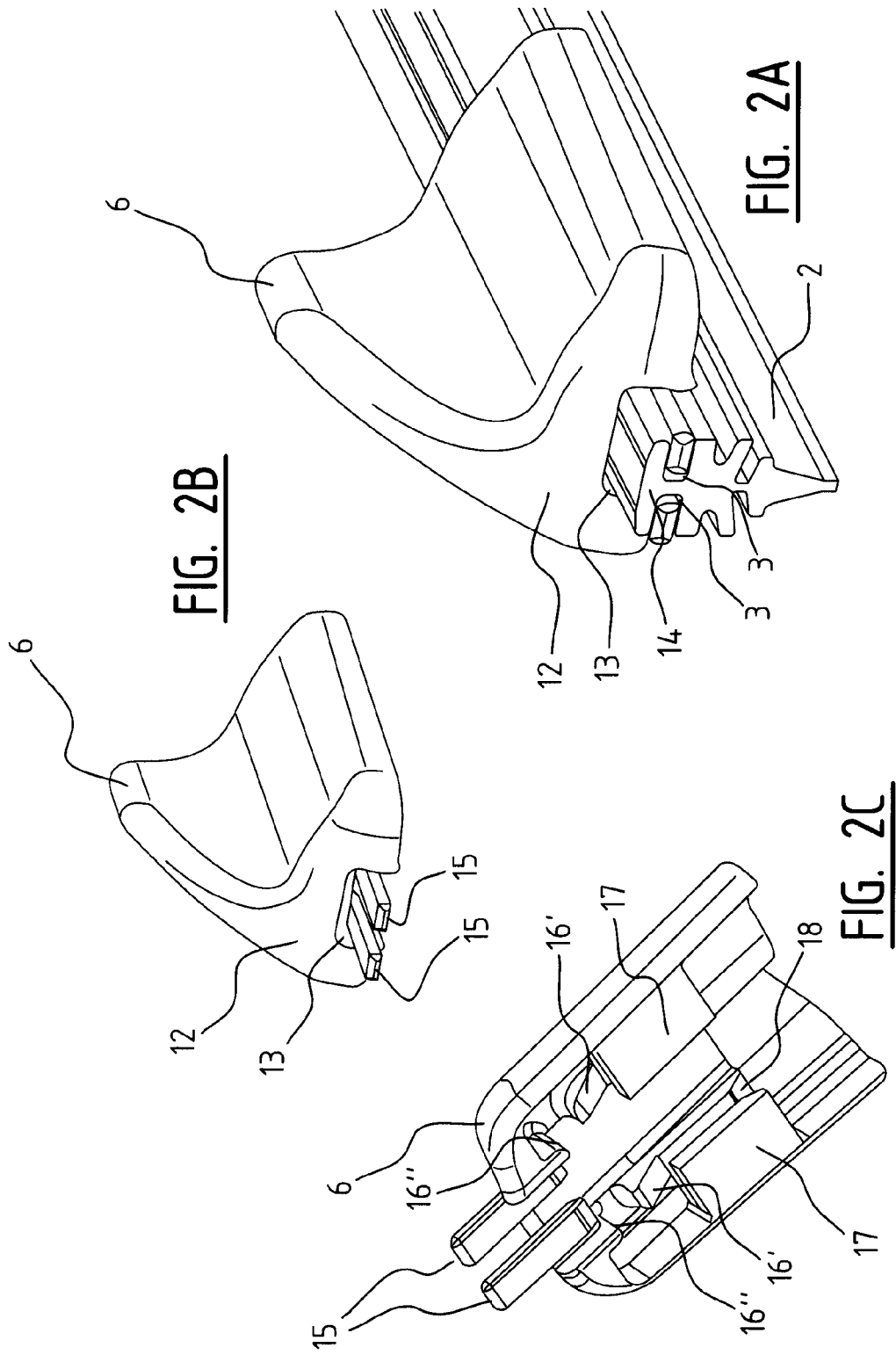
FIGS. 2a, 2b and 2c are schematic perspective views of a end part of a wiper blade according to a first embodiment, as used in the windscreen wiper device of FIG. 1.

Although not shown in FIGS. 1, 2 and 3, but fully understood by a skilled person, the oscillating arm 8 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 7 moves the wiper blade 2. The wiper blade 2 and the strips 4 comprise mutually cooperating means to block a longitudinal movement of the wiper blade in outward direction relative to the connecting piece. Particularly, the grooves 3 of the wiper blade 2 each comprise two stops in the form of opposing protrusions 22 extending laterally from a longitudinal wall of the wiper blade 2 located between the two opposing grooves 3 for blocking the longitudinal movement of the wiper blade 2 in outward direction relative to the end cap 6. Each strip 4 is provided on its interior longitudinal edge with a hole 23 within the outer contour thereof, wherein each protrusion 22 is located within a corresponding hole 23 in the strips 4. As can be seen, the holes 23 have a non-closed circumference and are preferably stamped.

The invention is not restricted to the embodiments shown, but also extends to other preferred embodiments falling within the scope of the appended claims.

The invention claimed is:

1. A yokeless windscreen wiper device comprising an elastic, elongated carrier, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier are disposed, wherein said strips are discrete elements that are self-biased into a pre-curved shape and which support and bias the wiper blade into pre-curved configuration independently of any wiper blade frame made up of several yokes pivoted to one another, wherein neighboring ends of said discrete longitudinal strips are interconnected by a respective end cap formed as a separate constructional element from said carrier, which windscreen wiper device comprises a connecting device for attachment to an oscillating wiper arm, wherein an end wall of at least one of said end cap comprises an opening, wherein an extended part of said wiper blade permanently extends through said opening and projects longitudinally beyond said at least one end cap, and wherein said at least one end cap includes at least one finger formed as an integral part of said at least one end cap and received in one of said longitudinal grooves and projecting longitudinally beyond said end wall of said at least one end cap and directly supporting said extended part of said wiper blade.

2. A windscreen wiper device according to claim 1, wherein said at least one end cap includes two of said longitudinal fingers extending longitudinally outwardly beyond said end wall of said connecting piece, and wherein each finger rests inside a corresponding longitudinal groove of said extended part of said wiper blade.

3. A windscreen wiper device according to claim 1, wherein said at least one finger also extends through said opening and into said connecting piece.

4. A windscreen wiper device according to claim 1, wherein said at least one end cap is spaced from and formed as a separate constructional element from said connecting device.

5. A windscreen wiper device according to claim 1, wherein said at least one finger is formed as a separate constructional element from that of said longitudinal strips.

* * * * *